(12) United States Patent
Dai et al.

(10) Patent No.: US 12,553,341 B2
(45) Date of Patent: Feb. 17, 2026

(54) FORMATION PERMEABILITY ANISOTROPY MEASUREMENT BY INJECTING THEN PUMPING OF INJECTION FLUID

(71) Applicant: Halliburton Energy Services, Inc., Houston, TX (US)

(72) Inventors: Bin Dai, Katy, TX (US); Christopher Michael Jones, Houston, TX (US); Zhonghuan Chen, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 371 days.

(21) Appl. No.: 18/232,046

(22) Filed: Aug. 9, 2023

(65) Prior Publication Data
US 2025/0052153 A1    Feb. 13, 2025

(51) Int. Cl.
E21B 49/10    (2006.01)

(52) U.S. Cl.
CPC ..................... E21B 49/10 (2013.01)

(58) Field of Classification Search
CPC ........................................................ E21B 49/10
See application file for complete search history.

(56) References Cited

U.S. PATENT DOCUMENTS

| | | | |
|---|---|---|---|
| 7,059,179 B2 * | 6/2006 | Proett | E21B 49/10 73/152.05 |
| 8,078,404 B2 * | 12/2011 | Sjolie | E21B 47/11 702/12 |
| 11,603,757 B2 * | 3/2023 | Proett | E21B 49/008 |
| 2003/0167835 A1 * | 9/2003 | Sinha | G01V 1/48 73/152.16 |
| 2008/0290876 A1 | 11/2008 | Ameen | |
| 2009/0211752 A1 | 8/2009 | Goodwin et al. | |

(Continued)

OTHER PUBLICATIONS

Proett, Mark A. et al., "Advanced Dual Probe Formation Tester with Transient, Harmonic, and Pulsed Time-Delay Testing Methods Determines Permeability, Skin, and Anisotropy", SPE 64650; Society of Petroleum Engineers; SPE International Oil and Gas Conference and Exhibition in China, Nov. 7-10, 2000.

(Continued)

*Primary Examiner* — Kristina M Deherrera
*Assistant Examiner* — Jean F Morello
(74) *Attorney, Agent, or Firm* — NOVAK DRUCE CARROLL LLP

(57) ABSTRACT

Aspects of the subject technology relate to systems, methods, and computer readable media for determining permeability anisotropy of a formation. A formation tester can be set at a location within a wellbore. A plurality of probes can be set into a formation at the location. A tracer solution can be injected into the formation. A fluid can be continuously withdrawn from the formation over a time interval through at least one of the plurality of probes. The fluid can comprise a volume of the tracer solution into the formation. A changing concentration of the tracer solution that is withdrawn from the formation over the time interval can be measured based on the volume of the tracer solution that is withdrawn from the formation over the time interval. A permeability anisotropy of the formation can be determined based on the changing concentration of the tracer solution.

20 Claims, 7 Drawing Sheets

(56) References Cited

U.S. PATENT DOCUMENTS

| | | |
|---|---|---|
| 2011/0198078 A1 | 8/2011 | Harrigan et al. |
| 2018/0171788 A1 | 6/2018 | Waid et al. |
| 2022/0243588 A1* | 8/2022 | Hudson ................ E21B 49/008 |
| 2023/0203945 A1 | 6/2023 | Proett et al. |

OTHER PUBLICATIONS

International Search Report & Written Opinion; PCT Application No. PCT/US2023/029995; mailed Apr. 30, 2024.

\* cited by examiner

FORMATION PERMEABILITY ANISOTROPY MEASUREMENT BY INJECTING THEN PUMPING OF INJECTION FLUID

TECHNICAL FIELD

The present technology pertains to determining a permeability anisotropy of a formation, and more particularly, to injecting and withdrawing a tracer solution into the formation to determine the permeability anisotropy of the formation.

BACKGROUND

During the drilling and completion of oil and gas wells, it may be necessary to engage in ancillary operations, such as monitoring the operability of equipment used during the drilling process or evaluating the production capabilities of formations intersected by the wellbore. For example, after a well or well interval has been drilled, zones of interest are often tested to determine various formation properties such as permeability, fluid type, fluid quality, formation temperature, formation pressure, and formation pressure gradient. These tests are performed in order to determine whether commercial exploitation of the intersected formations is viable and how to optimize production. Various tools and measurement techniques have been developed for evaluating formations through wellbores. For example, formation testers have been developed that probe the formation to identify formation properties.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
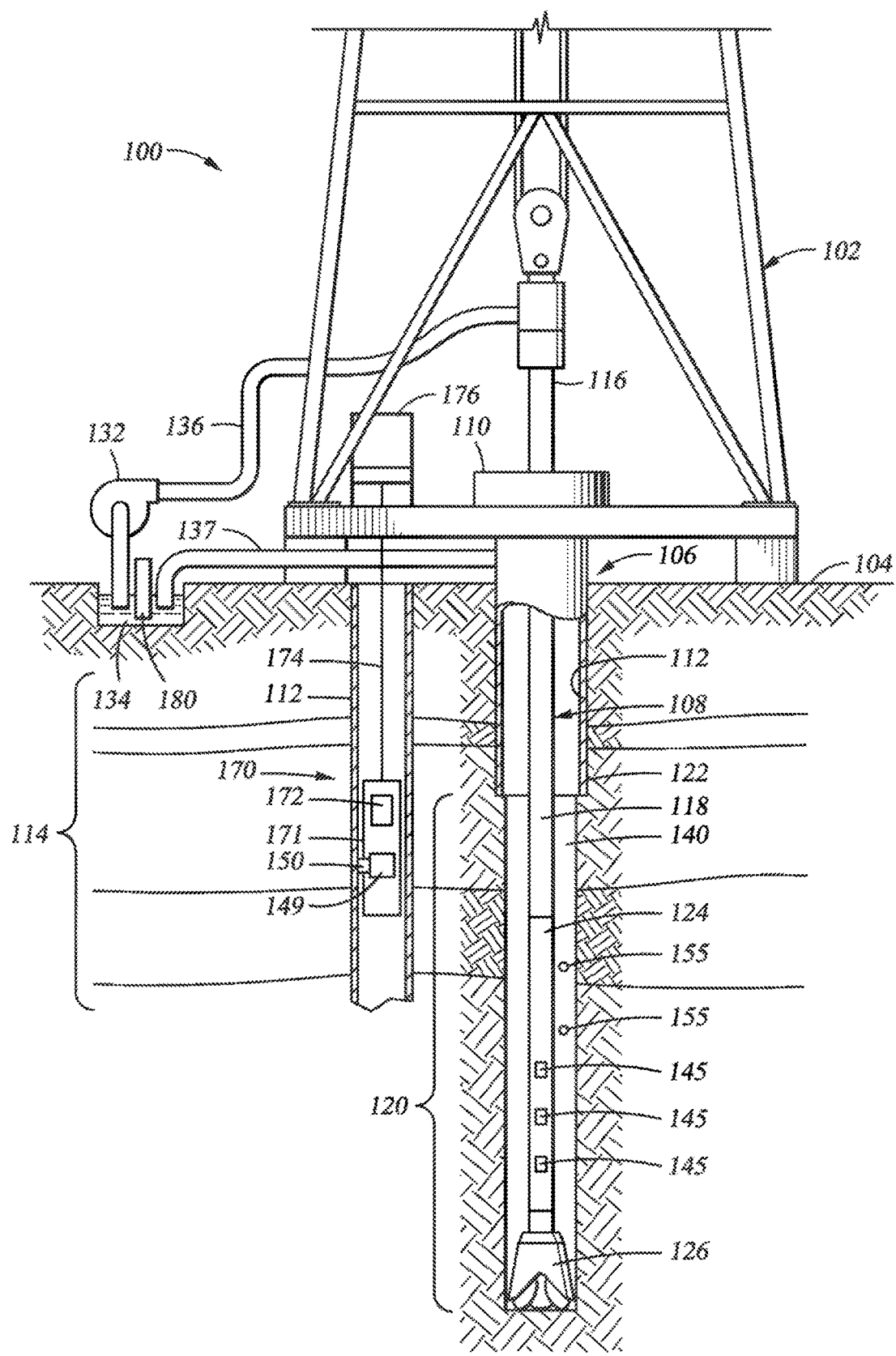
FIG. 1 illustrates a schematic diagram of a system for drilling operations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As discussed previously, during the drilling and completion of oil and gas wells, it may be necessary to engage in ancillary operations, such as monitoring the operability of equipment used during the drilling process or evaluating the production capabilities of formations intersected by the wellbore. For example, after a well or well interval has been drilled, zones of interest are often tested to determine various formation properties such as permeability, fluid type, fluid quality, formation temperature, formation pressure, and formation pressure gradient. These tests are performed in order to determine whether commercial exploitation of the intersected formations is viable and how to optimize production. Various tools and measurement techniques have been developed for evaluating formations through wellbores. For example, formation testers have been developed that probe the formation to identify formation properties.

In identifying formation properties, probes of formation testers can be inserted through a wellbore and into the formation. Then, fluid from the formation, e.g. formation fluid, can be withdrawn during a pump out phase. The formation fluid can be analyzed in determining formation properties. Further, pressures in the formation can be measured through the probes which can be used in identifying additional formation properties. Specifically, formation permeability anisotropy can be identified based on pressure transient analysis of source and observation probes of formation testers. However, current techniques for identifying anisotropy through the interpretation of pressure formation pressure suffer from numerous deficiencies. Specifically, it can be difficult to capture pressure measurements at a resolution sufficient for accurately identifying permeability anisotropy. Further, such tests are difficult to perform accurately in formations around horizontal sections of a wellbore.

The disclosed technology addresses the foregoing by injecting a tracer solution into a formation to identify properties of the formation. Specifically, a changing concentration of the tracer solution as it is withdrawn from the formation can be measured to identify a permeability anisotropy of the formation.

FIG. 1 illustrates a schematic diagram of a system 100 for drilling operations. It should be noted that the system 100 can also include a system for pumping operations, or other operations. The system 100 includes a drilling rig 102 located at a surface 104 of a well. The drilling rig 102 provides support for a down hole apparatus, including a drill string 108. The drill string 108 penetrates a rotary table 110 for drilling a borehole 112 through subsurface formations 114. The drill string 108 includes a Kelly 116 (in the upper portion), a drill pipe 118 and a bottom hole assembly 120 (located at the lower portion of the drill pipe 118). The bottom hole assembly 120 may include drill collars 122, a downhole tool 124 and a drill bit 126. The downhole tool 124 may be any of a number of different types of tools including measurement-while-drilling (MWD) tools, logging-while-drilling (LWD) tools, etc.

During drilling operations, the drill string 108 (including the Kelly 116, the drill pipe 118 and the bottom hole assembly 120) may be rotated by the rotary table 110. In addition or alternative to such rotation, the bottom hole assembly 120 may also be rotated by a motor that is downhole. The drill collars 122 may be used to add weight to the drill bit 126. The drill collars 122 also optionally stiffen the bottom hole assembly 120 allowing the bottom hole assembly 120 to transfer the weight to the drill bit 126. The weight provided by the drill collars 122 also assists the drill bit 126 in the penetration of the surface 104 and the subsurface formations 114.

During drilling operations, a mud pump 132 optionally pumps drilling fluid, for example, drilling mud, from a mud pit 134 through a hose 136 into the drill pipe 118 down to the drill bit 126. The drilling fluid can flow out from the drill bit 126 and return back to the surface through an annular area 140 between the drill pipe 118 and the sides of the borehole 112. The drilling fluid may then be returned to the mud pit 134, for example via pipe 137, and the fluid is filtered.

The downhole tool 124 may include one to a number of different sensors 145, which monitor different downhole parameters and generate data that is stored within one or more different storage mediums within the downhole tool 124 and communicated to the surface. The type of downhole tool 124 and the type of sensors 145 thereon may be dependent on the type of downhole parameters being measured. Such parameters may include the downhole temperature and pressure, the various characteristics of the subsurface formations (such as resistivity, radiation, density, porosity, etc.), the characteristics of the borehole (e.g., size, shape, etc.), etc. Further, and as will be discuss in greater detail later, the downhole tool 124 can include one or more fluid identification sensors for measuring a changing concentration of a tracer solution that is injected into the formation.

The downhole tool 124 further includes a power source 149, such as a battery or generator. A generator could be powered either hydraulically or by the rotary power of the drill string. The downhole tool 124 includes a formation testing tool 150, which can be powered by power source 149. In an embodiment, the formation testing tool 150 is mounted on a drill collar 122. The formation testing tool 150 includes a probe that engages the wall of the borehole 112 and extracts a sample of the fluid in the adjacent formation via a flow line. The probe can include one or more inner channels and one or more outer channels, where the one or more outer channels captures more contaminated fluid than the one or more inner channels. As will be described later in greater detail, the probe samples the formation and, in an option, inserts a fluid sample in a container 155. In an option, the tool 150 injects the carrier 155 into the return mud stream that is flowing intermediate the borehole wall 112 and the drill string 1 08, shown as drill collars 122 in FIG. 1. The container(s) 155 flow in the return mud stream to the surface and to mud pit or reservoir 134. A carrier extraction unit 160 is provided in the reservoir 134, in an embodiment. The carrier extraction unit 160 removes the carrier(s) 155 from the drilling mud.

FIG. 1 further illustrates an embodiment of a wireline system 170 that includes a downhole tool body 171 coupled to a base 176 by a logging cable 174. The logging cable 174 may include, but is not limited to, a wireline (multiple power and communication lines), a mono-cable (a single conductor), and a slick-line (no conductors for power or communications). The base 176 is positioned above ground and optionally includes support devices, communication devices, and computing devices. The tool body 171 houses a formation testing tool 150 that acquires samples from the formation. In an embodiment, the power source 149 is positioned in the tool body 171 to provide power to the formation testing tool 150. The tool body 171 may further include additional testing equipment 172. In operation, a wireline system 170 is typically sent downhole after the completion of a portion of the drilling. More specifically, the drill string 108 creates a borehole 112. The drill string is removed and the wireline system 170 is inserted into the borehole 112.

Figure 2:
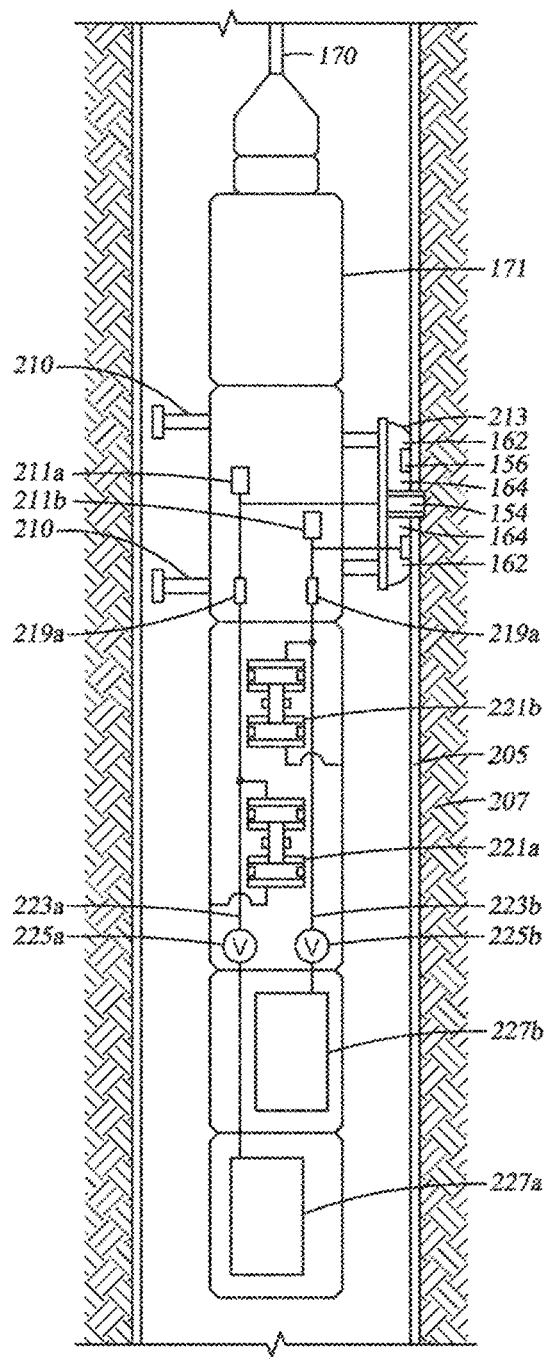
FIG. 2 illustrates the formation testing tool in greater detail.

FIG. 2 illustrates the formation testing tool 150 in greater detail. As mentioned above, the formation testing tool 150 can be included on the wireline system 170 or a drilling system, for example. It should be noted the formation testing tool 150 can be included on other tools, including, but not limited to tools that lower themselves into the borehole. In FIG. 2, an example of the wireline system is shown with formation testing tool 150.

A portion of a borehole 201 is shown in a subterranean formation 207. The borehole wall is covered by a mud cake 205. The formation tester body 171 is connected to a wireline system 170 leading from a rig at the surface. The formation tester body 171 is provided with a mechanism, denoted by 210, to clamp the tester body at a fixed position in the borehole. In an option, the clamping mechanism 210 is at the same depth as a probe. Other mechanisms for engaging the probe with the borehole include, but are not limited to inflatable packers.

In an exam pie, a clamping mechanism 210 and a fluid sampling pad 213 are extended and mechanically pressed against the borehole wall. The fluid sampling pad 213 includes a probe that has one or more outer channels 156, and one or more inner channels 154. The inner channel(s) 154 is disposed within at least a portion of the outer channel(s) 156. In an option, the inner channel(s) 154 is extended from the center of the pad, through the mud cake 205, and pressed into contact with the formation. For instance, the inner channel(s) 156 is connected by a hydraulic flow line 223a to an inner channel sample chamber 227a. In another option, the fluid sample pad 213 is extended via extendable members 211, and the inner and outer channels 154, 156 can contact the formation. In an option, flow lines 223a, 223b for the inner and/or outer channels 154, 156 extend through the extendable members 211, and to their respective channels. In a further option, the probe is an articulating probe, where the probe can hinge at one or more locations 184 to contact the surface of a formation and borehole more readily.

Figure 6B:
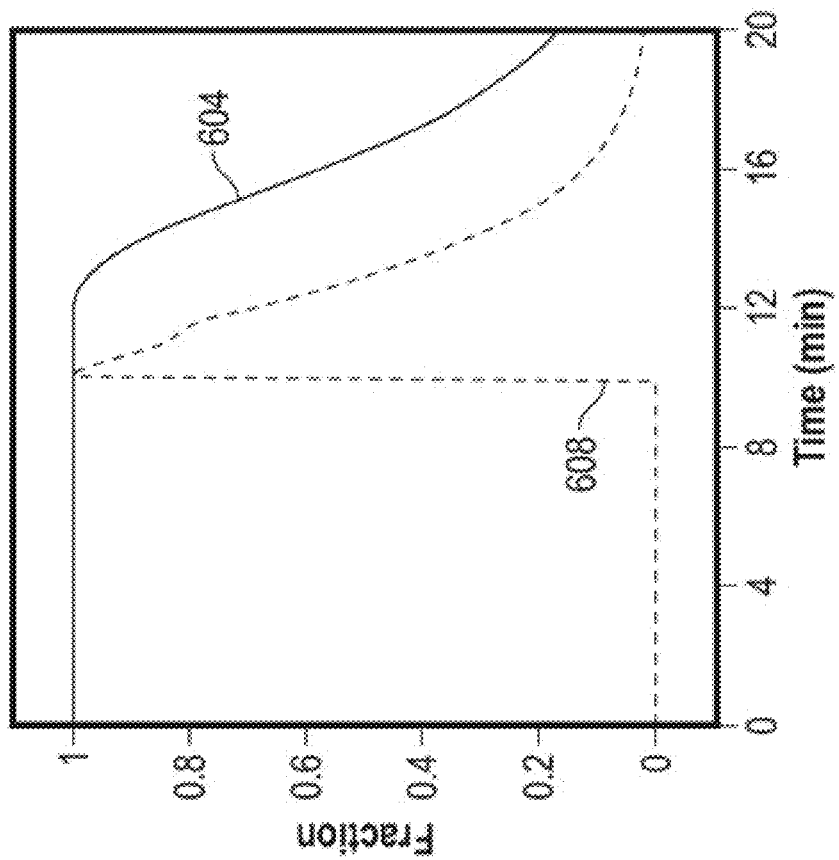
FIG. 6B illustrates a graph of a fraction of tracer solution that is pumped out of a first probe and a second probe versus time for a formation with a smaller anisotropy in comparison to the formation represented by the responses in FIG. 6A.
Figure 6A:
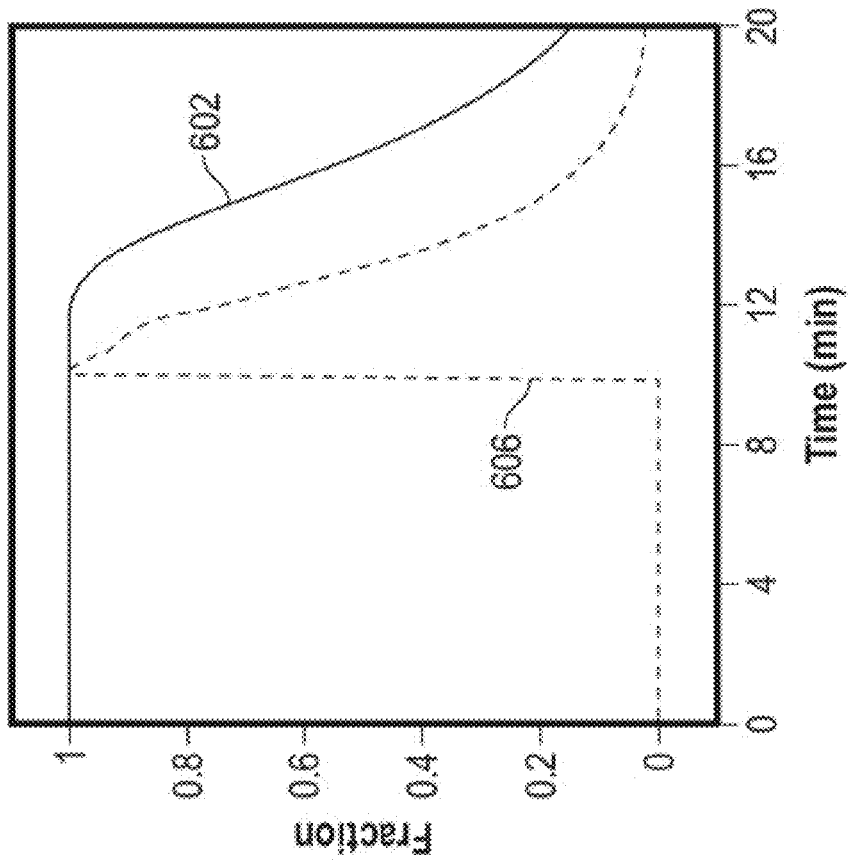
FIG. 6A illustrates a graph of a fraction of tracer solution that is pumped out of a first probe and a second probe versus time for a formation with an anisotropic permeability of 0.5.
Figure 7:
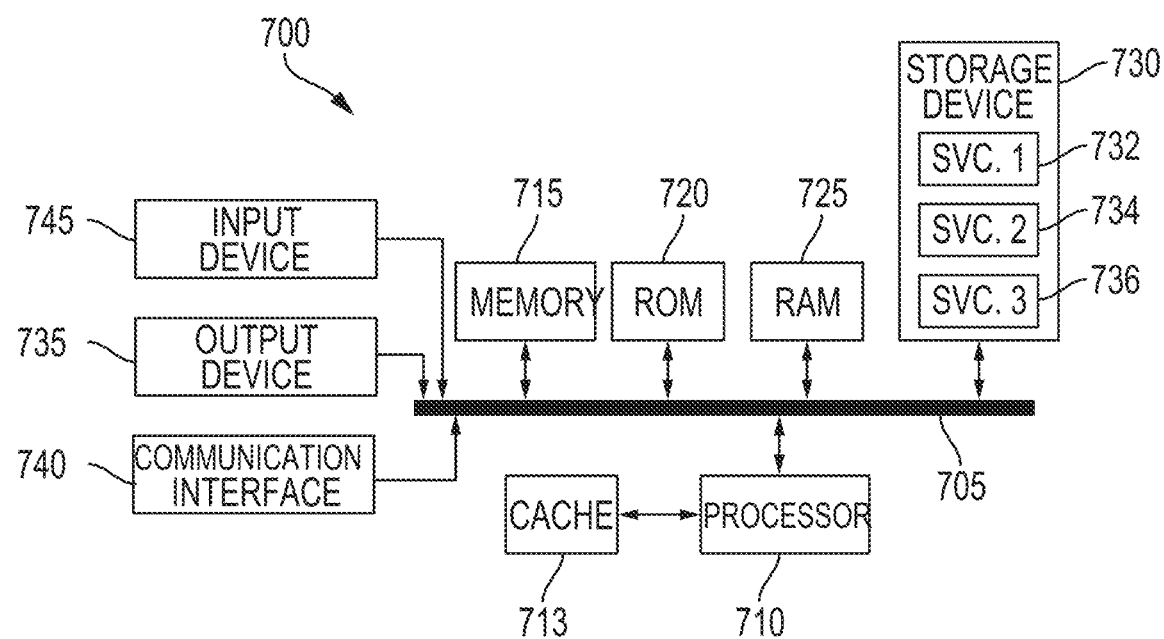
FIG. 7 illustrates an example computing device architecture which can be employed to perform various steps, methods, and techniques disclosed herein.

The outer channel(s) 156 has one or more openings 158 there along, the openings being hydraulic connected with the formation thru the channel. Optionally the outer channel(s) can be directly contacting the formation. All of the openings can be connected to one or more hydraulic lines within the body of the tool. In an option, the outer channel(s) 154 is connected by its own hydraulic flow line, 223b, to an outer channel sample chamber, 227b. Because the flow line 223a of the inner channel(s) 154 and the flow line 223b of the outer channel(s) 156 are separate, the fluid flowing into the outer channel(s) 156 does not mix with the fluid flowing into the inner channel(s) 154. The outer channel(s) can 156 isolate the flow into the inner channel(s) 154 from the borehole beyond the pad 213. In a further example, the inner channel flow line 223a and/or the outer channel flow line 223b extend through extendable members 204 (FIGS. 6 and 7).

The hydraulic flow lines 223a and 223b are optionally provided with pressure transducers 211a and 211b. In an option, the pressure maintained in the outer channel flowline 223b is the same as, or slightly less than, the pressure in the inner channel flowline 223a. In another option, the pressure ratio maintained in the inner channel flow line 223a to the outer channel flow line 223b is about 2:1 to 1:2. In another option, the flow rates of the inner channel(s) 154 and the outer channel(s) 156 are regulated. For example, the flow rate ration of the inner channel(s) 154 to the outer channel(s) 156 is about 2:1 to 1:2. With the configuration of the pad 213 and the outer channel(s) 156, contaminated borehole fluid that flows around the edges of the pad 213 is drawn into the outer channel(s) 156, and diverted from entry into the inner channel(s) 154.

The flow lines 223a and 223b are optionally provided with pumps 221a and 221b, or other devices for flowing fluid within the flow lines. The pumps 221a and 221b are operated long enough to substantially deplete the invaded zone in the vicinity of the pad 213 and to establish an equilibrium condition in which the fluid flowing into the inner channel(s) 154 is substantially free of contaminating borehole filtrate.

The flow lines 223a and 223b are also provided with fluid identification sensors, 219a and 219b. This makes it possible to compare the composition of the fluid in the inner channel flowline 223a with the fluid in the outer channel flowline. As sampling proceeds, if the borehole fluid continues to flow from the borehole towards the inner channel(s) 154, the contaminated fluid is drawn into the outer channel(s) 156. Pumps 221a and 221b discharge the sampled fluid into the borehole. At some time, an equilibrium condition is reached in which contaminated fluid is drawn into the outer channel(s) 156 and uncontaminated fluid is drawn into the inner channel(s) 154. The fluid identification sensors 219a and 219b are used to determine when this equilibrium condition has been reached. At this point, the fluid in the inner channel flowline is free or nearly free of contamination by borehole fluids. Valve 225a is opened, allowing the fluid in the inner channel flowline 223a to be collected in the inner channel sample chamber 227a. Similarly, by opening valve 225b, the fluid in the outer channel flowline 223b is collected in the outer channel sample chamber 227b. Alternatively, the fluid gathered in the outer channel(s) can be pumped to the borehole while the fluid in the inner channel flow line 223a is directed to the inner channel sample chamber 227a. Sensors that identify the composition of fluid in a flowline can also be provided, in an option.

The previous discussion of a formation tester with multiple channels to sample fluid from a formation is merely an example tester, and the technology described herein can be implemented through a formation tester that utilizes a single channel to sample fluid through one or more probes.

Figure 3:
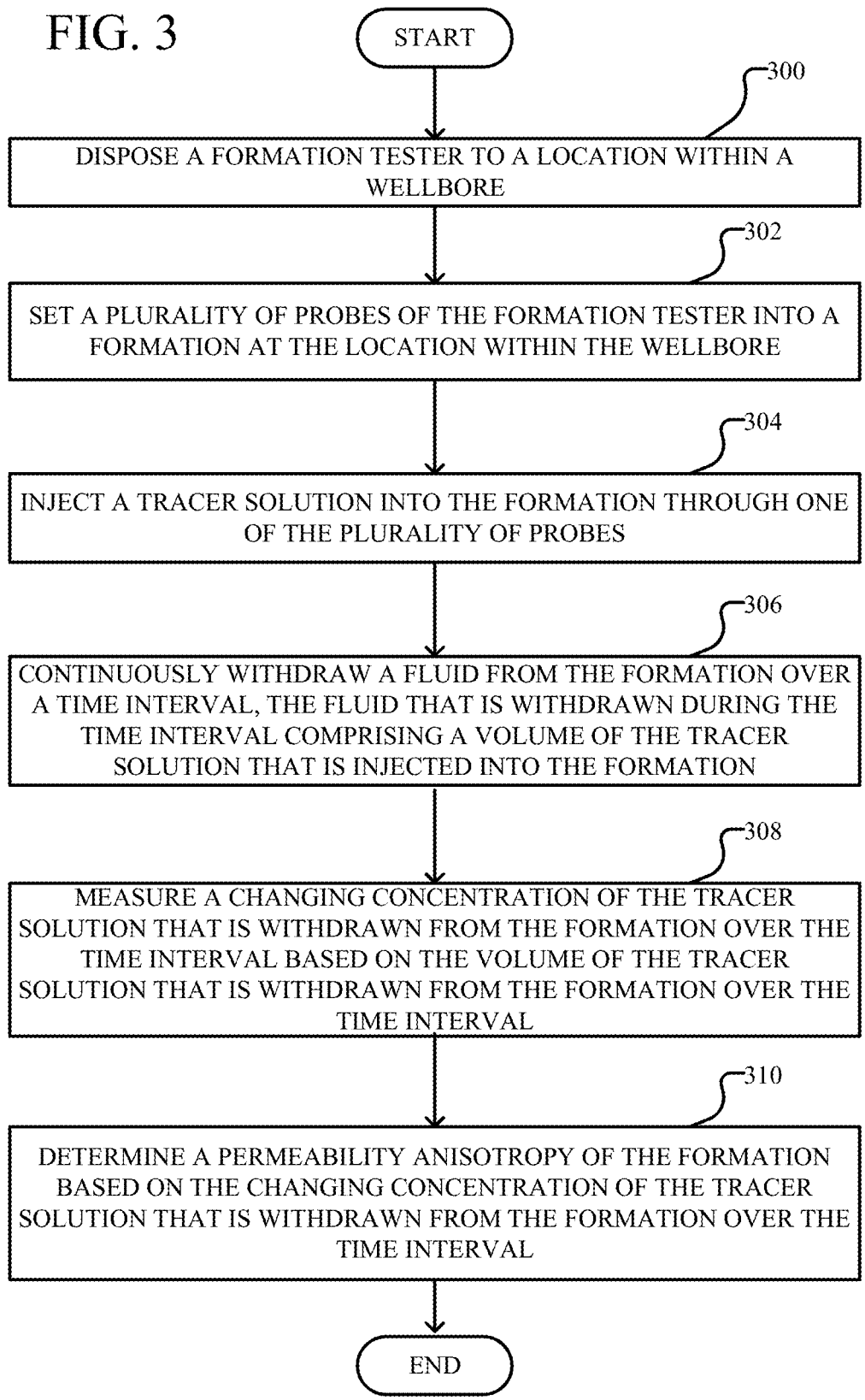
FIG. 3 illustrates a flowchart for an example method of determining a permeability anisotropy of a formation by injecting and withdrawing a tracer solution.

The disclosure now continues with a discussion of systems and techniques for identifying formation parameters through a tracer solution. Specifically, FIG. 3 illustrates a flowchart for an example method of determining a permeability anisotropy of a formation by injecting and withdrawing a tracer solution. The method shown in FIG. 3 is provided by way of example, as there are a variety of ways to carry out the method. Additionally, while the example method is illustrated with a particular order of steps, those of ordinary skill in the art will appreciate that FIG. 3 and the modules shown therein can be executed in any order and can include fewer or more modules than illustrated. Each module shown in FIG. 3 represents one or more steps, processes, methods or routines in the method.

At step 300, a formation tester is disposed to a location within a wellbore. The formation tester can be disposed to the location through an applicable system. Specifically, the formation tester can be disposed to the location through a wireline system. Further, the formation tester can be disposed to the location as part of an applicable MWD tool or a LWD tool. As will be discussed in greater detail later, the formation tester can include applicable components for injecting a tracer solution into a formation accessible through the wellbore. For example, the formation tester can include probes and a tracer solution injection system, e.g. a pump and reservoir, for containing and pumping a volume of tracer solution into a formation through one of the probes. Further and as will be discussed in greater detail later, the formation tester can include applicable components for withdrawing fluid from a formation accessible through the wellbore. For example, the formation tester can include probes and a fluid withdrawal system, e.g. a pump, for withdrawing fluid including the tracer solution from a formation through one or more of the probes. Additionally and as will be discussed in greater detail later, the formation tester can include applicable components for identifying an amount of tracer solution that is withdrawn from a formation accessible through the wellbore. For example, the formation tester can include one or more fluid identification sensors that are configured to determine a changing concentration of tracer solution as the solution is withdrawn from a formation though one or more probes.

Figure 4:
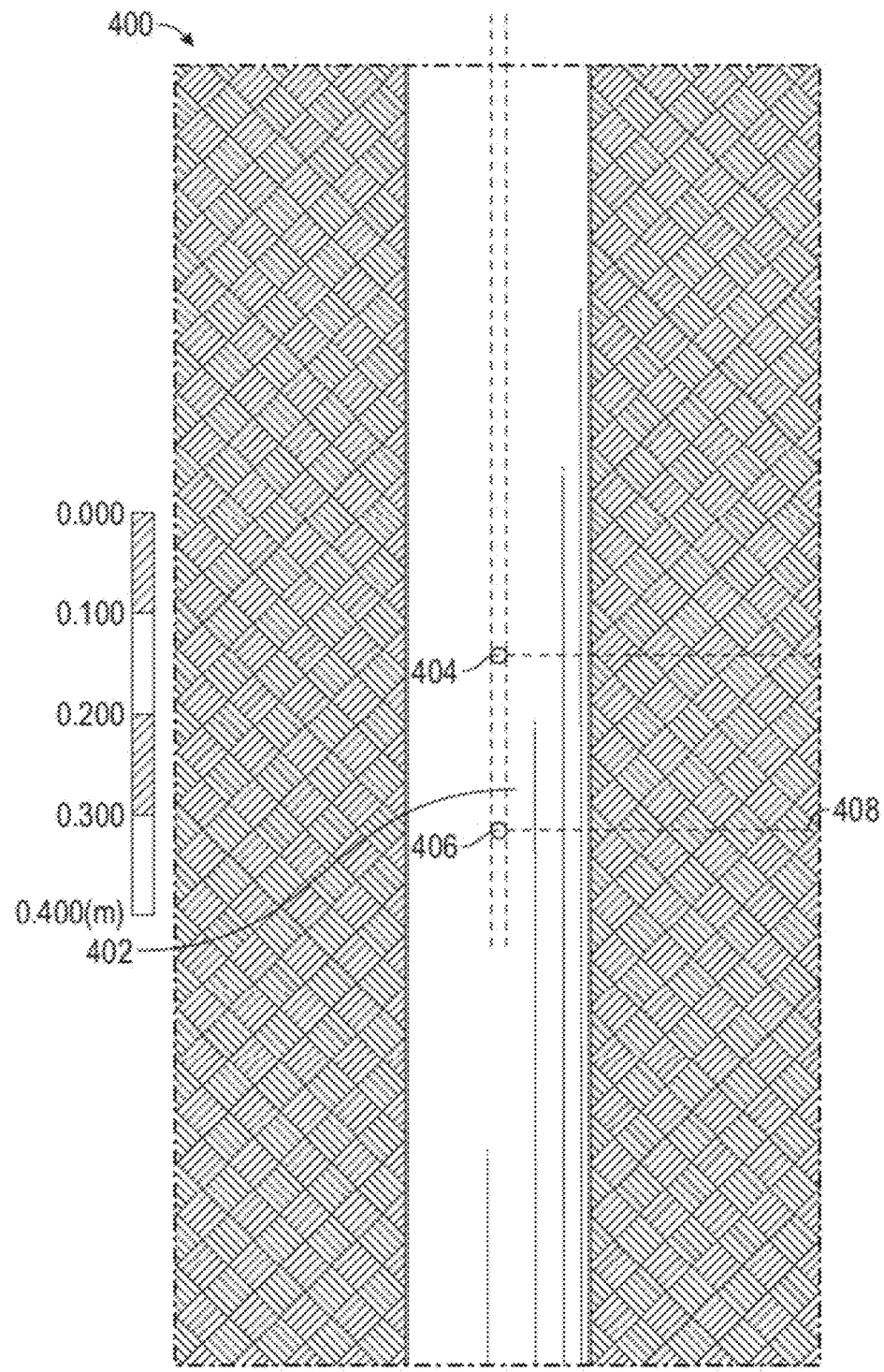
FIG. 4 illustrates a schematic diagram of a downhole environment with a formation tester disposed in a wellbore with a first probe and a second probe set into a surrounding formation.

Once the formation tester is disposed to the location within the wellbore, at step 302, a plurality of probes of the formation tester are set into a formation at the location within the wellbore. Specifically, FIG. 4 illustrates a schematic diagram of a downhole environment with a formation tester 402 disposed in a wellbore 400 with a first probe 404 and a second probe 406 set into a surrounding formation 408. In the example downhole environment, the formation tester 402 is only shown as having two probes that are set into the formation 408, however, the technology described herein can be implemented through a formation tester that has more than two probes that can be set into a formation to inject tracer solution and withdraw fluid. As part of setting the probes into the formation, the probes can engage the formation such that fluid communication is established between the formation and the formation tester through the probes. For example, the probes can be pushed into the formation such that tracer solution can be injected into the formation through the probes and fluid can be withdrawn from the formation the probes.

Probes of the formation tester can be disposed at specific positions with respect to each other. Specifically, the first probe 404 and the second probe 406 can be positioned at a set distance from each other. For example, the first probe 404 and the second probe 406 can be spaced 7.25 inches from each other. As will be discussed in greater detail later, the permeability anisotropy of the formation can be identified based on the set positions at which the probes of the formation tester are disposed with respect to each other. More specifically, the permeability anisotropy of the formation can be determined based on the distance between the first and second probes 404 and 406 and a concentration at which tracer solution is withdrawn by either or both of the first and second probes 404 and 406.

Returning back to the flowchart shown in FIG. 3, at step 304, a tracer solution is injected into the formation through one of the plurality of probes. A tracer solution can include an applicable solution with a distinguishing feature from a formation fluid of a formation. Specifically, a distinguishing feature of a tracer solution can be detected to distinguish the tracer solution from formation fluid of a formation into which the tracer solution is injected. More specifically, an amount of distinguishing feature of a tracer solution in a volume of fluid that is withdrawn from a formation can be used to determine a volume of the tracer solution in the volume of fluid. An example of a distinguishing feature is a dye material of a tracer solution that is optically distinguishable from a formation fluid. In turn, an amount of the dye material of the tracer solution in the formation fluid that is withdrawn from the formation can be used in identifying a varying concentration of the tracer solution in the formation fluid as it is withdrawn from the formation. Distinguishing features of the tracer solution include applicable features that can be detected by an applicable technique such as an optical measurement technique, a resistivity measurement technique, a density measurement technique, a viscosity measurement technique, an acoustic measurement technique, a nuclear measurement technique, a nuclear magnetic resonance measurement technique, or a combination thereof.

After injecting the tracer solution into the formation, the tracer solution will be distributed into the formation and the fluid's spatial distribution will depend on the permeability anisotropy of the formation. For example, in an isotropic formation, the tracer solution can distribute spherically, forming an invasion profile represented by a spheroid. If the anisotropy is low (kv<kh), then the tracer solution will invade deep horizontally and less vertically, forming an invasion profile represented by an oblate spheroid. If the anisotropy is high (kv>kh), then the tracer solution will invade faster vertically than horizontally, forming an invasion profile represented by a prolate spheroid.

Figure 5A:
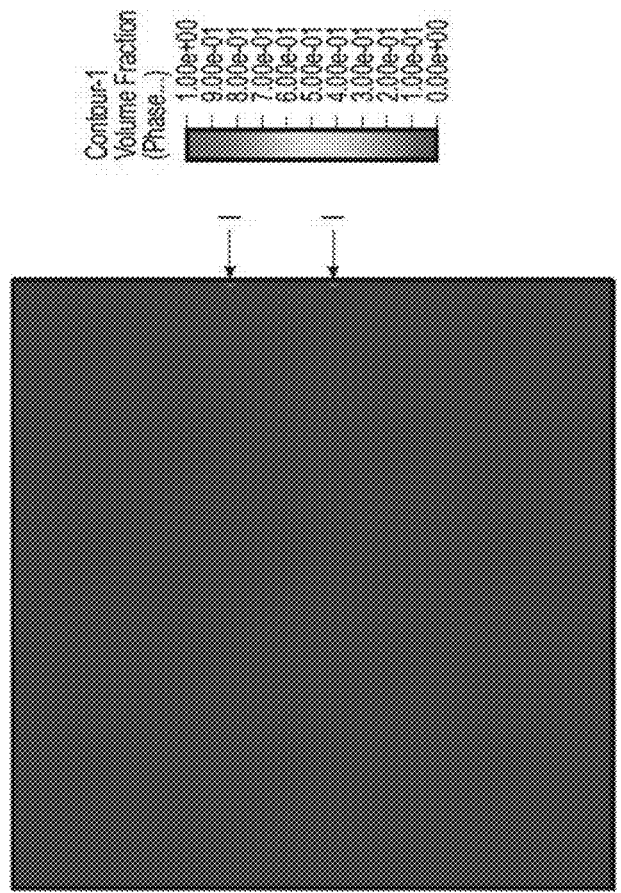
FIG. 5A is a simulated representation of a formation before tracer solution is injected into the formation.
Figure 5B:
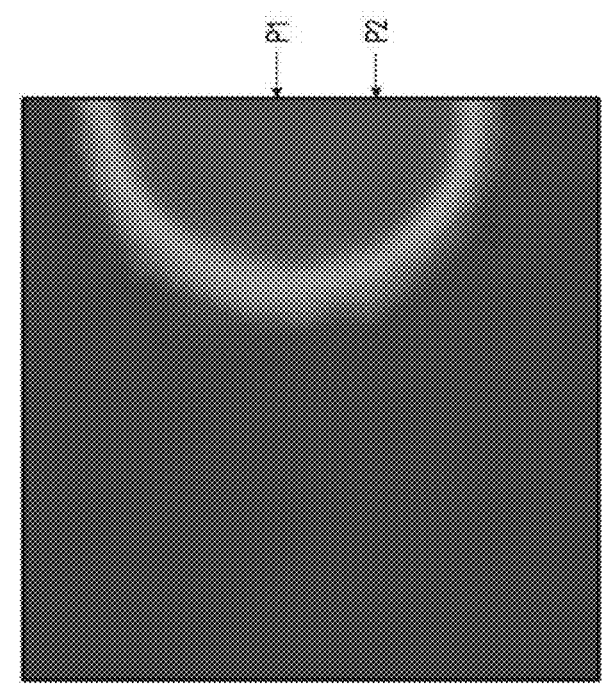
FIG. 5B is a simulated representation of the formation after the tracer solution is injected into the formation.

FIGS. 5A and 5B represent a distribution of a tracer solution in a formation. Specifically, FIG. 5A is a simulated representation of a formation before tracer solution is injected into the formation. FIG. 5B is a simulated representation of the formation after the tracer solution is injected into the formation. Specifically and as shown in FIG. 5B the tracer solution is injected through the first probe P1 for a period of ten minutes. Further and as shown in FIG. 5B, the tracer solution spreads to a region of the formation in which the second probe P2 is in fluid communication with the formation. The formation represented in FIGS. 5A and 5B is an isotropic formation.

The tracer solution can be injected into the formation until a specific volume of the tracer solution has been injected into the formation. The specific volume of the tracer solution to inject into the formation can be selected based on specific factors related to determining characteristics of the formation based on the injected tracer solution. For example, the specific volume of the tracer solution to inject into the formation can be selected based on known characteristics of the formation in relation to determining permeability anisotropy of the formation. Further, the tracer solution can be injected into the formation after a specific amount of time has passed since beginning injection of the tracer solution into the formation. The specific amount of time to inject the tracer solution into the formation can be selected based on specific factors related to determining characteristics of the formation based on the injected tracer solution. For example, the specific amount of time for injecting the tracer solution into the formation can be selected based on known characteristics of the formation in relation to determining permeability anisotropy of the formation.

After the tracer solution is injected into the formation, a fluid can be continuously withdrawn from the formation over a specific time interval. The fluid that is withdrawn from the formation can include either or both tracer solution and formation fluid. Specifically, the fluid that is withdrawn from the formation can comprise no tracer solution, almost pure tracer solution, or a changing concentration of tracer solution within formation fluid as the fluid is withdrawn from the formation over time, e.g. a time interval. For example, and with respect to the distribution profile shown in FIG. 5B, the first and second probes can be used to withdraw fluid from the formation. As shown in the distribution profile, a volume of the tracer solution is in fluid communication with the first and second probes. Therefore, initially fluid that is withdrawn through the probes will have a high concentration of tracer solution. The concentration of tracer solution will begin to decrease as more and more fluid is withdrawn from the formation. The changing concentration of the tracer solution as fluid is withdrawn from the formation can be referred to as a concentration profile or concentration decay profile of the tracer solution.

Fluid can be withdrawn from the formation through an applicable number of probes of the formation tester that are set into the formation. For example and with respect to the environment shown in FIG. 4, fluid can be withdrawn from the formation 408 through both the first probe 404 and the second probe 406. In using multiple probes to withdraw fluid from the formation, the fluid can be withdrawn either sequentially or synchronously over different portions of a time interval during which the fluid is withdrawn. For example, fluid can first be withdrawn from the formation 408 through the first probe 404 and then the second probe 406 in a sequential manner. In another example, fluid can simultaneously be withdrawn from the formation 408 through both the first probe 404 and the second probe 406 in a synchronous manner.

At step 308, a changing concentration of the tracer solution that is withdrawn from the formation can be measured over the time interval. Specifically, the changing concentration of the tracer solution can be measured from the withdrawn fluid based on the volume of the tracer solution that is withdrawn from the formation over the time interval. More specifically, the changing concentration of the tracer solution can be measured and represented as a concentration decay profile of the tracer solution.

The changing concentration of the tracer solution in the fluid that is withdrawn from the formation can depend on the distribution profile of the tracer solution in the formation after it is injected into the formation. The distribution profile of the tracer solution in the formation can depend on characteristics of the formation, e.g. permeability anisotropy of the formation. Accordingly, the changing concentration of the tracer solution in the fluid that is withdrawn from the formation can be indicative of the characteristics of the formation, e.g. the permeability anisotropy of the formation.

The concentration of the tracer solution that is withdrawn from the formation can be measured through one or more fluid identification sensors. Specifically, the fluid identification sensors can measure the changing concentration of the tracer solution in the fluid that is withdrawn from the formation. The one or more fluid identification sensors can measure the concentration through an applicable technique, such as an optical measurement technique, a resistivity measurement technique, a density measurement technique, a viscosity measurement technique, an acoustic measurement technique, a nuclear measurement technique, a nuclear magnetic resonance measurement technique, or a combination thereof. For example, the fluid identification sensors can include nuclear magnetic resonance sensors that use nuclear magnetic resonance-based techniques to identify concentrations of the tracer solution in the fluid that is withdrawn from the formation.

At step 310, a permeability anisotropy of the formation is determined based on the changing concentration of the tracer solution that is withdrawn from the formation over the time interval. Specifically, the concentration decay profiles of the tracer solution for the formation can be analyzed to determine the permeability anisotropy of the formation. More specifically, the concentration decay profiles of the tracer solution can be analyzed across probes that are used to withdraw the fluid from the formation to determine the permeability anisotropy of the formation. For example the concentration decay curve that is measured at the first probe 404 can be compared to the concentration decay curve that is measured at the second probe 406 to generate a decay ratio curve between the two probes. In turn, one or more analytical formulas can be applied to the decay ratio curve to identify permeability anisotropy.

In determining permeability anisotropy based on a changing concentration of the tracer solution that is withdrawn from the formation, the permeability anisotropy can be determined based on known positions of the probes relative to each other. Specifically, a model can be applied based on a known distance between probes to identify a permeability anisotropy. More specifically, the model can be applied to concentration decay curves of the corresponding probes and based on the known distance between the probes to identify a permeability anisotropy of a formation.

A model can be applied to corresponding tracer solution concentration profiles gathered by one or more probes to identify the permeability anisotropy of the formation. The model can represent varying permeability anisotropies as a function of varying tracer solution profiles, e.g. tracer solution decay profiles. The model can be trained using applicable sources of data and built through an applicable machine learning architecture. Specifically, concentration profile changes for various cases of formation and anisotropy properties can be simulated. As follows machine learning or statistical learning, e.g. Kriging, can be used to derive a model that relates the concentration profile and formation permeability anisotropy. Further, machine learning models can be trained based on known permeability data and observed concentration profile changes of tracer solution across varying formations.

Permeability anisotropy can also be determined based on measured pressure changes at the probes that are set in the formation. Specifically, permeability anisotropy can be determined based on both measured pressure changes at the probes and corresponding concentration profiles of the tracer solution that are measured at the probes. More specifically, corresponding pressure changes and tracer solution concentration decay curves can be observed and correlated, e.g. temporally, to accurately identify permeability anisotropy, e.g. in comparison to using just pressure changes to measure permeability.

The disclosure now continues with a discussion of the effect of anisotropy on permeability in formations, as observed through tracer solution concentration simulation. Specifically, FIG. 6A illustrates a graph of a fraction of tracer solution that is pumped out of a first probe and a second probe versus time for a formation with an anisotropic permeability of 0.5. FIG. 6B illustrates a graph of a fraction of a tracer solution that is pumped out of a first probe and a second probe versus time for a formation with a smaller anisotropy in comparison to the formation represented by the responses in FIG. 6A. As shown in both FIGS. 6A and 6B the withdrawal of tracer solution from the formation, e.g. during a pumpout phase, occurs at ten minutes. When comparing the responses of the first probes across the formations, represented by curves 602 and 604, a similar response is seen between the two formations. When comparing the responses of the second probes across the formations, represented by curves 606 and 608, differences in the responses are noticed. Specifically, the tracer solution concentration profile in the formation with the higher anisotropy, represented in FIG. 6B, decays slower than the formation with the smaller anisotropy, represented in FIG. 6B. This shows the effect of anisotropy on permeability in formations, as observed through tracer solution concentration simulation.

FIG. 7 illustrates an example computing device architecture 700 which can be employed to perform various steps, methods, and techniques disclosed herein. Specifically, the computing device architecture can be integrated with the electromagnetic imaging tools described herein. Further, the computing device can be configured to implement the techniques of controlling borehole image blending through machine learning described herein.

As noted above, FIG. 7 illustrates an example computing device architecture 700 of a computing device which can implement the various technologies and techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 713 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising: disposing a formation tester to a location within a wellbore; setting a plurality of probes of the formation tester into a formation at the location within the wellbore; injecting a tracer solution into the formation through one of the plurality of probes; continuously withdrawing a fluid from the formation over a time interval through at least one of the plurality of probes, the fluid that is withdrawn during the time interval comprising a volume of the tracer solution that is injected into the formation; measuring a changing concentration of the tracer solution that is withdrawn from the formation over the time interval based on the volume of the tracer solution that is withdrawn from the formation over the time interval; and determining a permeability anisotropy of the formation based on the changing concentration of the tracer solution that is withdrawn from the formation over the time interval.

Statement 2. The method of statement 1, wherein the plurality of probes comprises a first probe and a second probe, the first probe is configured to inject the tracer solution into the formation, and first probe and the second probe are configured to withdraw the fluid from the formation over the time interval.

Statement 3. The method of statement 2, wherein the first probe and the second probe are configured to either sequentially or synchronously withdraw the fluid from the formation over different portions of the time interval.

Statement 4. The method of any of statements 1 through 3, wherein the plurality of probes comprises a first probe, a second probe, and a third probe, the first probe is configured to inject the tracer solution into the formation, and the first probe, the second probe, and the third probe are configured to withdraw the fluid from the formation over the time interval.

Statement 5. The method of any of statements 1 through 4, wherein the changing concentration of the tracer solution is measured through one or more fluid identification sensors and the one or more fluid identification sensors are configured to measure the changing concentration of the tracer solution that is withdrawn from the formation over the time interval through an optical measurement technique, a resistivity measurement technique, a density measurement technique, a viscosity measurement technique, an acoustic measurement technique, a nuclear measurement technique, a nuclear magnetic resonance measurement technique, or a combination thereof.

Statement 6. The method of any of statements 1 through 5, wherein the tracer solution comprises a detectable distinguishing feature from formation fluid of the formation.

Statement 7. The method of any of statements 1 through 6, further comprising injecting the tracer solution into the formation through one of the plurality of probes until either a specific volume of the tracer solution has been injected into the formation or a specific amount of time has passed since beginning injection of the tracer solution into the formation.

Statement 8. The method of any of statements 1 through 7, wherein the plurality of probes comprises a first probe and a second probe, the method further comprising: identifying corresponding concentration decay profiles of the tracer solution in being withdrawn through the first probe and the second probe; and analyzing the corresponding concentration decay profiles to determine the permeability anisotropy of the formation.

Statement 9. The method of any of statements 1 through 8, further comprising: measuring a pressure change at one or more of the plurality of the probes while fluid is withdrawn from the formation over the time interval; and determining the permeability anisotropy of the formation based on both the pressure change at the one or more of the plurality of the probes and the changing concentration of the tracer solution that is withdrawn from the formation over the time interval.

Statement 10. The method of any of statements 1 through 9, further comprising: accessing different concentration decay profiles of tracer solution withdrawal from various formations; generating a model that relates varying concentration decay profiles to varying formation permeability anisotropy based on the different concentration decay profiles; and applying the model to determine the permeability anisotropy of the formation based on the changing concentration of the tracer solution that is withdrawn from the formation over the time interval.

Statement 11. A system comprising: one or more processors; and at least one computer-readable storage medium having stored therein instructions which, when executed by the one or more processors, cause the one or more processors to: control setting of a plurality of probes of a formation tester into a formation at a location within a wellbore; control injection of a tracer solution into the formation through one of the plurality of probes; control continuous withdrawal of a fluid from the formation over a time interval through at least one of the plurality of probes, the fluid that is withdrawn during the time interval comprising a volume of the tracer solution that is injected into the formation; measure a changing concentration of the tracer solution that is withdrawn from the formation over the time interval based on the volume of the tracer solution that is withdrawn from the formation over the time interval; and determine a permeability anisotropy of the formation based on the changing concentration of the tracer solution that is withdrawn from the formation over the time interval.

Statement 12. The system of statement 11, wherein the plurality of probes comprises a first probe and a second probe, the first probe is configured to inject the tracer solution into the formation, and first probe and the second probe are configured to withdraw the fluid from the formation over the time interval.

Statement 13. The system of statement 12, wherein the first probe and the second probe are configured to either sequentially or synchronously withdraw the fluid from the formation over different portions of the time interval.

Statement 14. The system of any of statements 11 through 13, wherein the plurality of probes comprises a first probe, a second probe, and a third probe, the first probe is configured to inject the tracer solution into the formation, and the first probe, the second probe, and the third probe are configured to withdraw the fluid from the formation over the time interval.

Statement 15. The system of any of statements 11 through 14, wherein the changing concentration of the tracer solution is measured through one or more fluid identification sensors and the one or more fluid identification sensors are configured to measure the changing concentration of the tracer solution that is withdrawn from the formation over the time interval through an optical measurement technique, a resistivity measurement technique, a density measurement technique, a viscosity measurement technique, an acoustic measurement technique, a nuclear measurement technique, a nuclear magnetic resonance measurement technique, or a combination thereof.

Statement 16. The system of any of statements 11 through 15, wherein the instructions which when executed by the one or more processors further cause the one or more processors to control the injection of the tracer solution into the formation through one of the plurality of probes until either a specific volume of the tracer solution has been injected into the formation or a specific amount of time has passed since beginning the injection of the tracer solution into the formation.

Statement 17. The system of any of statements 11 through 16, wherein the plurality of probes comprises a first probe and a second probe, and the instructions further cause the one or more processors to: identify corresponding concentration decay profiles of the tracer solution in being withdrawn through the first probe and the second probe; and analyze the corresponding concentration decay profiles to determine the permeability anisotropy of the formation.

Statement 18. The system of any of statements 11 through 17, wherein the instructions further cause the one or more processors to: measure a pressure change at one or more of the plurality of the probes while fluid is withdrawn from the formation over the time interval; and determine the permeability anisotropy of the formation based on both the pressure change at the one or more of the plurality of the probes and the changing concentration of the tracer solution that is withdrawn from the formation over the time interval.

Statement 19. The system of any of statements 11 through 18, wherein the instructions further cause the one or more processors to: access different concentration decay profiles of tracer solution withdrawal from various formations; generate a model that relates varying concentration decay profiles to varying formation permeability anisotropy based on the different concentration decay profiles; and apply the model to determine the permeability anisotropy of the formation based on the changing concentration of the tracer solution that is withdrawn from the formation over the time interval.

Statement 20. A formation tester system comprising: a plurality of probes configured to be set into a formation at a location within a wellbore; a tracer solution injection system configured to inject a tracer solution into the formation through one of the plurality of probes; a fluid withdrawal system configured to continuously withdraw a fluid from the formation over a time interval through at least one of the plurality of probes, the fluid that is withdrawn during the time interval comprising a volume of the tracer solution that is injected into the formation; one or more fluid identification sensors configured to measure a changing concentration of the tracer solution that is withdrawn from the formation over the time interval based on the volume of the tracer solution that is withdrawn from the formation over the time interval; and one or more processors configured to determine a permeability anisotropy of the formation based on the changing concentration of the tracer solution that is withdrawn from the formation over the time interval.

Statement 21. A system comprising means for performing a method according to any of statements 1 through 10.

What is claimed is:

1. A method comprising:
    disposing a formation tester to a location within a wellbore;
    setting a plurality of probes of the formation tester into a formation at the location within the wellbore;
    injecting a tracer solution into the formation through one of the plurality of probes;
    continuously withdrawing a fluid from the formation over a time interval through at least one of the plurality of probes, the fluid that is withdrawn during the time interval comprising a volume of the tracer solution that is injected into the formation;
    measuring a changing concentration of the tracer solution that is withdrawn from the formation over the time interval based on the volume of the tracer solution that is withdrawn from the formation over the time interval; and
    determining a permeability anisotropy of the formation based on the changing concentration of the tracer solution that is withdrawn from the formation over the time interval.

2. The method of claim 1, wherein the plurality of probes comprises a first probe and a second probe, the first probe is configured to inject the tracer solution into the formation, and first probe and the second probe are configured to withdraw the fluid from the formation over the time interval.

3. The method of claim 2, wherein the first probe and the second probe are configured to either sequentially or synchronously withdraw the fluid from the formation over different portions of the time interval.

4. The method of claim 1, wherein the plurality of probes comprises a first probe, a second probe, and a third probe, the first probe is configured to inject the tracer solution into the formation, and the first probe, the second probe, and the third probe are configured to withdraw the fluid from the formation over the time interval.

5. The method of claim 1, wherein the changing concentration of the tracer solution is measured through one or more fluid identification sensors and the one or more fluid identification sensors are configured to measure the changing concentration of the tracer solution that is withdrawn from the formation over the time interval through an optical measurement technique, a resistivity measurement technique, a density measurement technique, a viscosity measurement technique, an acoustic measurement technique, a nuclear measurement technique, a nuclear magnetic resonance measurement technique, or a combination thereof.

6. The method of claim 1, wherein the tracer solution comprises a detectable distinguishing feature from formation fluid of the formation.

7. The method of claim 1, further comprising injecting the tracer solution into the formation through one of the plurality of probes until either a specific volume of the tracer solution has been injected into the formation or a specific amount of time has passed since beginning injection of the tracer solution into the formation.

8. The method of claim 1, wherein the plurality of probes comprises a first probe and a second probe, the method further comprising:
    identifying corresponding concentration decay profiles of the tracer solution in being withdrawn through the first probe and the second probe; and
    analyzing the corresponding concentration decay profiles to determine the permeability anisotropy of the formation.

9. The method of claim 1, further comprising:
    measuring a pressure change at one or more of the plurality of the probes while fluid is withdrawn from the formation over the time interval; and
    determining the permeability anisotropy of the formation based on both the pressure change at the one or more of the plurality of the probes and the changing concentration of the tracer solution that is withdrawn from the formation over the time interval.

10. The method of claim 1, further comprising:
    accessing different concentration decay profiles of tracer solution withdrawal from various formations;
    generating a model that relates varying concentration decay profiles to varying formation permeability anisotropy based on the different concentration decay profiles; and
    applying the model to determine the permeability anisotropy of the formation based on the changing concentration of the tracer solution that is withdrawn from the formation over the time interval.

11. A system comprising:
    one or more processors; and
    at least one computer-readable storage medium having stored therein instructions which, when executed by the one or more processors, cause the one or more processors to:
        control setting of a plurality of probes of a formation tester into a formation at a location within a wellbore;
        control injection of a tracer solution into the formation through one of the plurality of probes;

control continuous withdrawal of a fluid from the formation over a time interval through at least one of the plurality of probes, the fluid that is withdrawn during the time interval comprising a volume of the tracer solution that is injected into the formation;

measure a changing concentration of the tracer solution that is withdrawn from the formation over the time interval based on the volume of the tracer solution that is withdrawn from the formation over the time interval; and determine a permeability anisotropy of the formation based on the changing concentration of the tracer solution that is withdrawn from the formation over the time interval.

12. The system of claim 11, wherein the plurality of probes comprises a first probe and a second probe, the first probe is configured to inject the tracer solution into the formation, and first probe and the second probe are configured to withdraw the fluid from the formation over the time interval.

13. The system of claim 12, wherein the first probe and the second probe are configured to either sequentially or synchronously withdraw the fluid from the formation over different portions of the time interval.

14. The system of claim 11, wherein the plurality of probes comprises a first probe, a second probe, and a third probe, the first probe is configured to inject the tracer solution into the formation, and the first probe, the second probe, and the third probe are configured to withdraw the fluid from the formation over the time interval.

15. The system of claim 11, wherein the changing concentration of the tracer solution is measured through one or more fluid identification sensors and the one or more fluid identification sensors are configured to measure the changing concentration of the tracer solution that is withdrawn from the formation over the time interval through an optical measurement technique, a resistivity measurement technique, a density measurement technique, a viscosity measurement technique, an acoustic measurement technique, a nuclear measurement technique, a nuclear magnetic resonance measurement technique, or a combination thereof.

16. The system of claim 11, wherein the instructions which when executed by the one or more processors further cause the one or more processors to control the injection of the tracer solution into the formation through one of the plurality of probes until either a specific volume of the tracer solution has been injected into the formation or a specific amount of time has passed since beginning the injection of the tracer solution into the formation.

17. The system of claim 11, wherein the plurality of probes comprises a first probe and a second probe, and the instructions further cause the one or more processors to:

identify corresponding concentration decay profiles of the tracer solution in being withdrawn through the first probe and the second probe; and analyze the corresponding concentration decay profiles to determine the permeability anisotropy of the formation.

18. The system of claim 11, wherein the instructions further cause the one or more processors to:

measure a pressure change at one or more of the plurality of the probes while fluid is withdrawn from the formation over the time interval; and determine the permeability anisotropy of the formation based on both the pressure change at the one or more of the plurality of the probes and the changing concentration of the tracer solution that is withdrawn from the formation over the time interval.

19. The system of claim 11, wherein the instructions further cause the one or more processors to:

access different concentration decay profiles of tracer solution withdrawal from various formations;

generate a model that relates varying concentration decay profiles to varying formation permeability anisotropy based on the different concentration decay profiles; and apply the model to determine the permeability anisotropy of the formation based on the changing concentration of the tracer solution that is withdrawn from the formation over the time interval.

20. A formation tester system comprising:

a plurality of probes configured to be set into a formation at a location within a wellbore;

a tracer solution injection system configured to inject a tracer solution into the formation through one of the plurality of probes;

a fluid withdrawal system configured to continuously withdraw a fluid from the formation over a time interval through at least one of the plurality of probes, the fluid that is withdrawn during the time interval comprising a volume of the tracer solution that is injected into the formation;

one or more fluid identification sensors configured to measure a changing concentration of the tracer solution that is withdrawn from the formation over the time interval based on the volume of the tracer solution that is withdrawn from the formation over the time interval; and one or more processors configured to determine a permeability anisotropy of the formation based on the changing concentration of the tracer solution that is withdrawn from the formation over the time interval.

* * * * *